United States Patent [19]

Johnson

[11] Patent Number: 5,540,457
[45] Date of Patent: Jul. 30, 1996

[54] STEERING ASSEMBLY WITH EXTERNAL BEARING PRE-LOAD ADJUSTMENT

[75] Inventor: Bryn P. Johnson, Richmond, Canada

[73] Assignee: Rocky Mountain Bicycle Company Ltd., Canada

[21] Appl. No.: 299,483

[22] Filed: Aug. 31, 1994

[51] Int. Cl.⁶ .................................................. B62K 21/12
[52] U.S. Cl. ........................ 280/279; 74/551.1; 403/370
[58] Field of Search ................................. 280/279, 281.1; 403/370, 368, 367; 74/551.1, 551.2, 551.3, 551.4, 551.5

[56] References Cited

U.S. PATENT DOCUMENTS

| | | | |
|---|---|---|---|
| 3,831,979 | 8/1974 | Baginski | 74/551.1 |
| 4,274,301 | 6/1981 | Katayama | 74/551.1 |
| 4,466,629 | 8/1984 | Sinyard | 280/279 |
| 5,095,770 | 3/1992 | Rader, III | 74/551.1 |
| 5,197,349 | 3/1993 | Herman | 74/551.4 |
| 5,201,242 | 4/1993 | Chi | 74/551.1 |
| 5,291,797 | 3/1994 | Chi | 74/551.1 |
| 5,303,611 | 4/1994 | Chi | 74/551.1 |
| 5,319,993 | 6/1994 | Chiang | 74/551.1 |
| 5,387,255 | 2/1995 | Chiang | 280/279 |

FOREIGN PATENT DOCUMENTS 206530  5/1981  Taiwan .

OTHER PUBLICATIONS

1994 Taipei International Cycle Show Report, Jul. 1994–Section on Meng Jing Industrial Co. Ltd. products.

*Primary Examiner*—Mitchell J. Hill
*Attorney, Agent, or Firm*—Oyen Wiggs Green & Mutala

[57] ABSTRACT

A bicycle steering assembly is disclosed. The assembly has a threadless steerer tube passing through a head tube. Bearing assemblies are mounted at either end of the steerer tube. A stem assembly is fastened to the upper end of the steerer tube with an expansion bolt, which is preferably a wedge clamp, inside the bore of the steerer tube. The stem has an integral sleeve which extends over the upper end of the exterior surface of the steerer tube. The sleeve reinforces the steerer tube. The lower end of the sleeve is threaded to accept a threaded locking collar. Pre-load on the bearings can be adjusted by turning the locking collar. The stem assembly has few parts, fastens securely to the steerer tube, is robust and does not have projecting bolts which could harm a rider.

19 Claims, 3 Drawing Sheets

STEERING ASSEMBLY WITH EXTERNAL BEARING PRE-LOAD ADJUSTMENT

BACKGROUND OF THE INVENTION

1. Field of the Invention

This invention relates to a steering assembly for use in a bicycle, tricycle or similar vehicle. The invention has particular application to steering assemblies incorporating threadless steerer tubes.

2. Description of the Related Art

Prior art bicycle steering assemblies commonly include a front wheel mounted in a fork assembly. The fork assembly has a steerer tube which extends upwardly through a head tube mounted to the bicycle frame. The upper end of the steerer tube projects past the top of the head tube. The steerer tube is pivotally mounted to the head tube by bearing assemblies at either end of the head tube. During normal use the bearing assemblies may be exposed to very large forces. The bearing assemblies typically each comprise upper and lower races separated by a plurality of ball bearings which roll on bearing surfaces of the upper and lower races.

Applying the correct amount of pre-load force to the bearing assemblies is important to the proper functioning of such prior art steering assemblies. If there is too little pre-load then the bearings will be loose and incapable of transmitting forces from the steerer tube to the head tube without suffering damage. If the bearings are very loose then steering control may be adversely affected. Too much pre-load force can damage the bearings, cause the bearings to bind and make the steering action rough.

In so-called "threaded" prior art steering assemblies the steerer tube is secured by a nut threaded on an externally threaded section of the steerer tube. The lower surface of the nut bears on the upper race of the upper bearing assembly. The lower race of the lower bearing assembly is mounted to the steerer tube. In these steering assemblies, bearing pre-load is adjusted by altering the tightness of the nut. A separate lock-nut is generally provided to lock the nut in position after the bearing pre-load has been set. Such assemblies have the disadvantage that it is difficult to properly set bearing pre-load because tightening the lock-nut generally turns the nut sufficiently to alter the bearing pre-load. With this design it is also difficult to prevent the nut from coming loose during use. Furthermore, providing external threads on the steerer tube is an expensive manufacturing step.

U.S. Pat. No. 5,095,770, Rader III shows a bicycle steering assembly in which the steerer tube is "threadless", that is, it has a smooth outer surface with no external threads. The top end of the steerer tube is threaded internally. An adjustment screw is threaded into the top end of the steerer tube. The adjustment screw applies pressure to the top race of the upper bearing assembly via a mounting sleeve and a tapered compression ring. In a bicycle, handlebars are mounted at one end of a stem attached to the mounting sleeve. Steering assemblies according to the Rader III design have recently become very popular, especially in high quality all terrain bicycles.

In the Rader III assembly, the mounting sleeve is clamped externally to the steerer tube. The mounting sleeve must be fixed relative to the steerer tube because the bicycle handlebar stem is mounted to the mounting sleeve. It is not possible to affix the mounting sleeve by clamping it inside the bore of the steerer tube because of the adjustment screw which threads into the upper end of the steerer tube.

The need to clamp the sleeve externally to the steerer tube causes the Rader III design to have some disadvantages. Fixing the sleeve to the steerer tube generally requires either protruding clamping bolts, which can injure a rider in a fall, or alternative clamping arrangements which are either structurally weak or can cause damage to the steerer tube if over-tightened.

A further disadvantage of the Rader III design is that it is somewhat difficult to properly set the bearing pre-load. This is because there is friction between the sleeve and the steerer tube. To set bearing pre-load, the sleeve must be loosened and slid upward and then the adjustment screw must be tightened just enough to provide the correct bearing pre-load. If the adjustment screw is over-tightened then the adjustment screw must be loosened, the sleeve must be slid upward and the process repeated. Bearing pre-load cannot be reliably reduced by simply loosening the adjustment nut because the sleeve might not slide freely up the steerer tube when the adjustment nut is loosened.

U.S. Pat. No. 5,303,611 Chi discloses an upper steering assembly for a bicycle in which an externally threaded member is clamped to the outside surface of a steerer tube. A locking nut is threaded on the externally threaded member. Bearing pre-load can be set by turning the locking nut relative to the externally threaded member. This design has several parts which are expensive to machine.

U.S. Pat. No. 5,201,242, Chi and U.S. Pat. No. 5,319,993 disclose designs for a bicycle steering assemblies which are similar to the Rader III design but do not require internal threads on the bicycle steerer tube. Like the Rader III design, these designs use stem assemblies which clamp to the outside of the steerer tube. These designs suffer from disadvantages similar to those of the Rader III design.

U.S. Pat. No. 5,303,611, Chi discloses a mechanism for adjusting pre-load on steering bearings in a bicycle equipped with a threadless steerer tube. Chi provides a compression socket which clamps to the steerer tube. The compression socket has external threads around its lower periphery. A rotational socket is threaded to the compression socket. Pre-load on a bearing assembly mounted beneath the rotational socket may be adjusted by turning the rotational socket with respect to the compression socket. The Chi design includes several relatively complicated parts and requires handlebars to be mounted to the steerer tube with separate components.

SUMMARY OF THE INVENTION

An object of this invention is to provide a handlebar stem which is useful with a threadless steerer tube and yet overcomes some of the above-noted disadvantages of the prior art.

This invention provides an improved steering assembly for a vehicle. The steering assembly comprises: a head tube connected to a frame of the vehicle; a steerer tube having a wheel mounted at one end thereof and a second end extending through the head tube and projecting past an upper end of the head tube; a bearing assembly at the upper end of the head tube; and, a stem assembly connected to the steerer tube. The improvement is that the stem assembly comprises: a member (or plug) slidably engaged in a bore of said steerer tube; mounting means on the member to affix the member within the bore; a sleeve connected to the member and extending over an outer surface of the steerer tube; and extension means on the sleeve for applying longitudinal pre-load force to the bearing assembly.

Another aspect of the invention provides a stem assembly for use in a bicycle having a threadless steerer tube. The stem assembly comprises: a cap member; a rod slidably engageable in a bore of a steerer tube and affixed to the cap member; mounting means on the rod for affixing a first end of the rod within the bore of the steerer tube; a cylindrical sleeve mounted to the cap member concentric with the rod, the sleeve slidably engageable around an exterior surface of the steerer tube, the sleeve and the rod defining a deep annular channel therebetween for receiving an end of the steerer tube; attachment means on the sleeve for attaching handlebars to the stem assembly; and extension means at an end of the sleeve away from the cap member for applying a longitudinal force to a surface adjacent the end of the sleeve.

BRIEF DESCRIPTION OF THE DRAWINGS

The preferred embodiment of the invention will now be described with reference to the following drawings in which.

DETAILED DESCRIPTION OF THE PREFERRED EMBODIMENT

Figure 1:
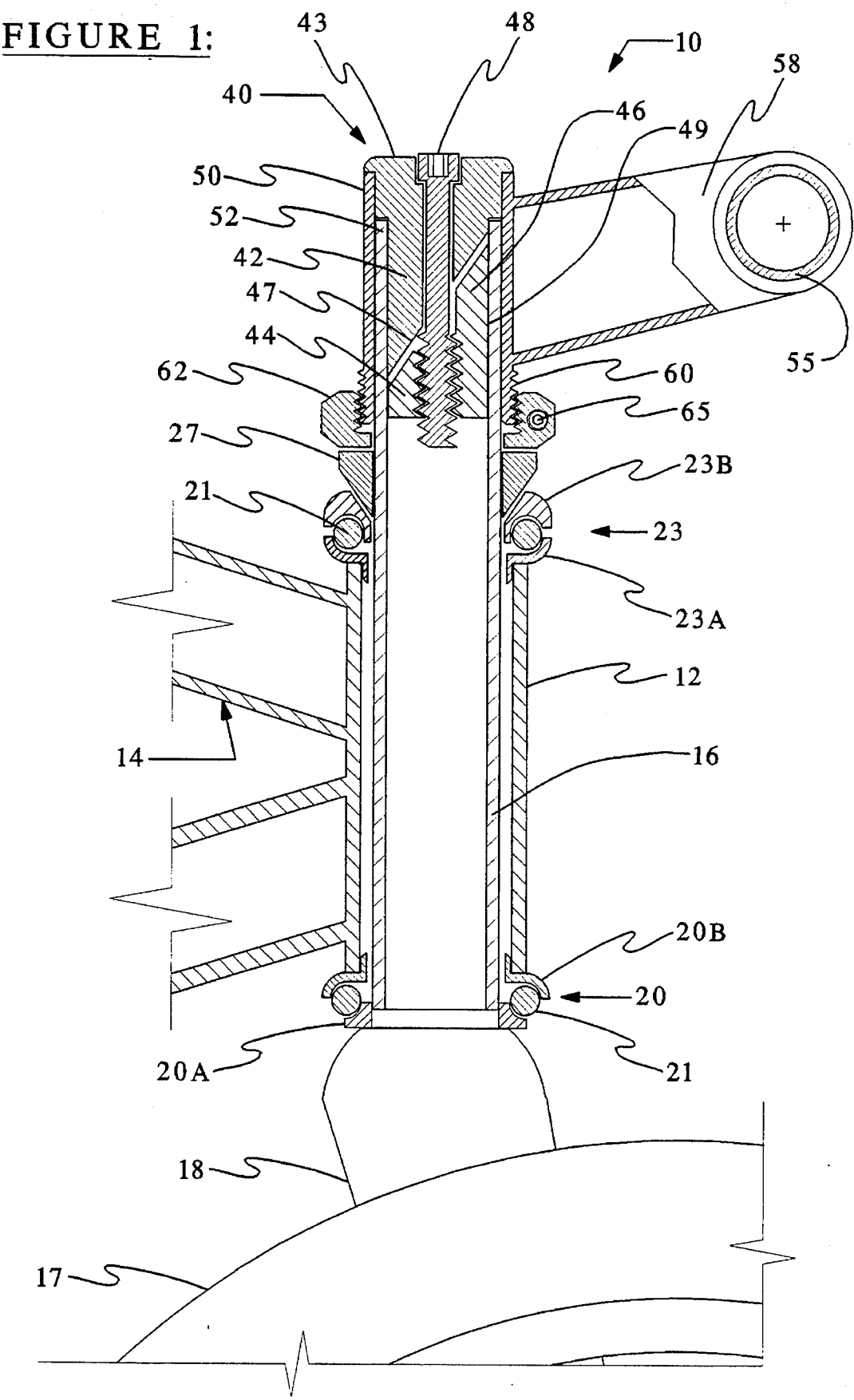
FIG. 1 is a section through a steering assembly according to the invention.
Figure 2:
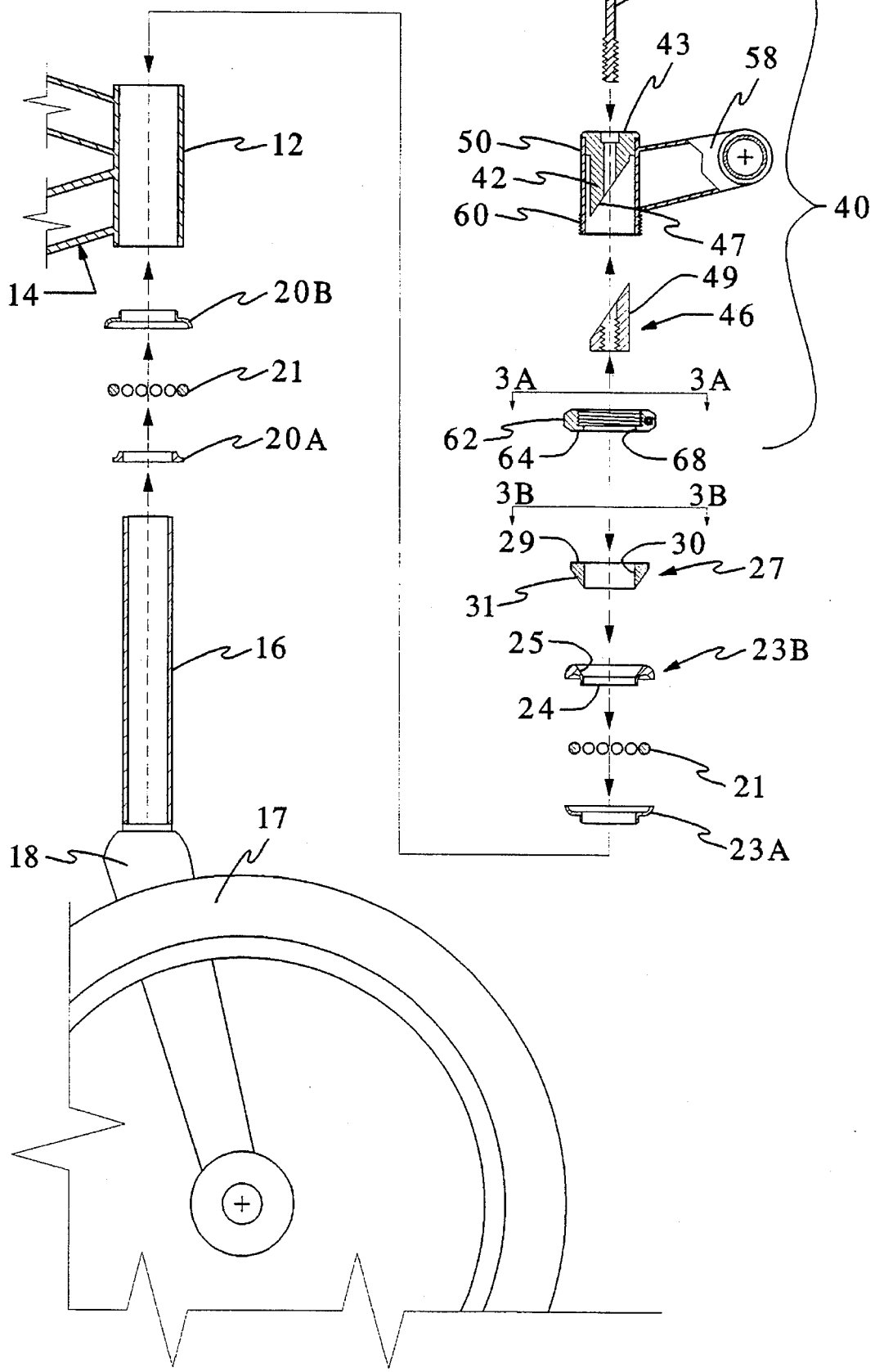
FIG. 2 is an exploded view of the steering assembly of FIG. 1.
Figure 3A:
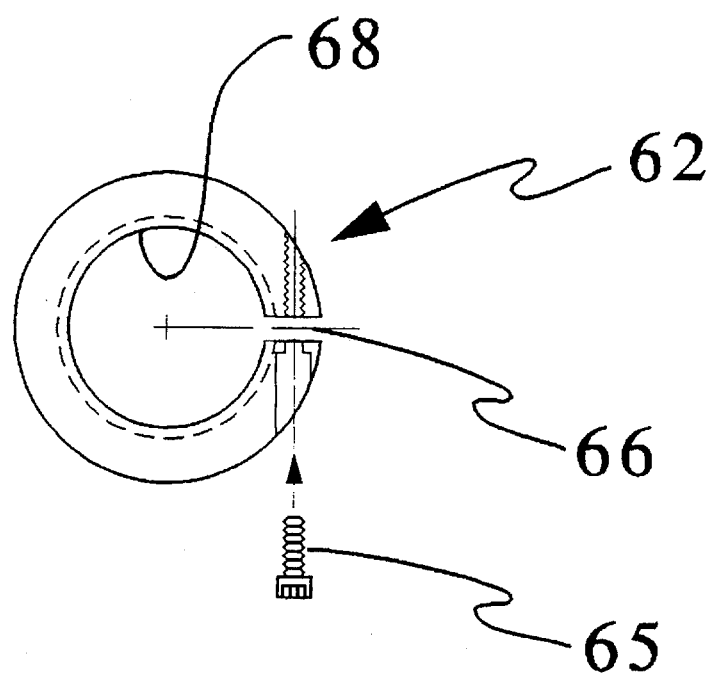
FIG. 3A is a plan view of a locking nut for use in the invention and FIG. 3B is a plan view of a compression ring for use with the invention.
Figure 3B:
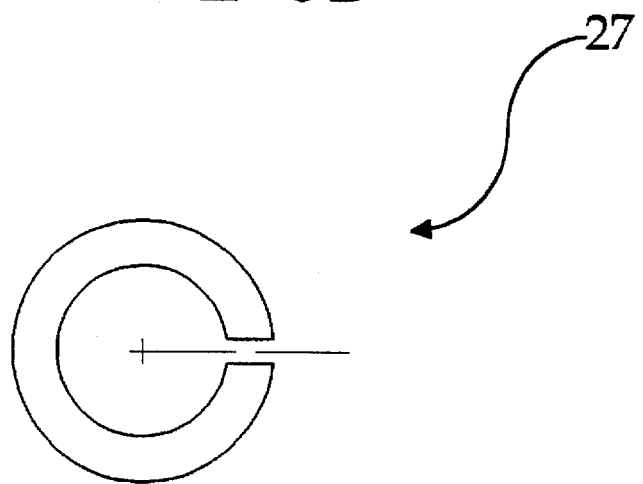

FIGS. 1 and 2 show a steering assembly 10 according to the invention. Steering assembly 10 comprises a head tube 12 attached to the frame 14 of a bicycle. A steerer tube 16 is attached to the crown of front fork 18 and extends upwardly through head tube 12. Lower and upper bearing assemblies 20, 23 maintain the axis of steerer tube 16 fixed relative to head tube 12 but permit steerer tube 16 to pivot within head tube 12. A wheel 17 is mounted to front fork 18. The wheel may be steered by pivoting steerer tube 16 in head tube 12.

Although steerer tube 16 could have external threads and still be used with the invention, steerer tube 16 preferably has a smooth cylindrical outer surface. Lower bearing assembly 20 comprises first and second races 20A, 20B and a plurality of ball bearings 21 between races 20A and 20B. First race 20A is mounted to steerer tube 16 and second race 20B is on the lower end of head tube 12. Upper bearing assembly 23 similarly comprises first and second races 23A and 23B with ball bearings 21 disposed between the first and second races. First race 23A is on the upper end of head tube 12. Second race 23B sits on top of first race 23A and is compressed toward lower race 23B by a stem assembly 40. Bearing assemblies 20, 23 may use roller, cartridge, thrust or needle bearings instead of ball bearings 21 without departing from the scope of the invention.

Preferably upper bearing assembly 23 is constructed in the manner of the upper bearing assembly described in U.S. Pat. No. 5,095,770 which is incorporated herein by reference. Such bearing assemblies are available from Diacompe U.S.A. Inc. of 355 Cane Creek Road, Fletcher N.C., U.S.A. 28732 as part of that company's AHEADSET™ bicycle head sets. Second race 23B has a central aperture 24 having an inner diameter somewhat greater than the outer diameter of steerer tube 16. An angled annular contact surface 25 is provided around the upper periphery of aperture 24. An annular split compression ring 27 is provided between stem assembly 40 and second race 23B. Compression ring 27 has a top surface 29, an inner surface 30, and a tapered contact surface 31.

Stem assembly 40 is mounted to the upper end of steerer tube 16. Stem assembly 40 has a plug (or rod) 42 which projects downwardly from a top cap 43 into the bore of steerer tube 16. Rod 42 is preferably cylindrical and is preferably slightly smaller in diameter than the interior diameter of steerer tube 16 so that rod 42 can be slid into the bore of steerer tube 16 without binding. Rod 42 may be solid or may be a section of tubing attached to top cap 43.

Stem assembly 40 is affixed to steerer tube 16 by a wedge clamp 44 mounted at the lower end of rod 42. Wedge clamp 44 comprises a wedge 46 which abuts an inclined engagement surface 47 on the lower end of rod 42 and a bolt 48. Bolt 48 passes through a clearance hole in top cap 43 and rod 42 and threads into wedge 46. Preferably the head of bolt 48 is recessed below the upper surface of top cap 43 so that it does not present a projection which could injure a rider in a fall.

Tightening bolt 48 causes wedge 46 to slide along inclined engagement surface 47. In so moving, the outer surface 49 of wedge 46 is forced radially outward against the inner wall of steerer tube 16 thereby firmly fastening rod 42 within the bore of steerer tube 16. Alternative secure mounting means for firmly fastening rod 42 in place inside the bore of steerer tube 16 such as other known types of expansion bolt may be used in place of wedge clamp 44. Preferably the mounting means are internal to the bore of steerer tube 16.

Stem assembly 40 further comprises an outer sleeve 50 which extends downward from top cap 43 over the outer surface of steerer tube 16. Sleeve 50 and rod 42 together define a channel 52 which receives the upper end of steerer tube 16. Preferably sleeve 50 extends to a point approximately even with wedge clamp 44. Sleeve 50 then reinforces the outside of steerer tube 16 in the vicinity of wedge clamp 44. Preferably, steerer tube 16 is a slip fit inside sleeve 50 so that sleeve 50 can be slid over steerer tube 16 until the upper end of steerer tube 16 is in contact with top cap 43. It can be appreciated that it is unnecessary to clamp sleeve 50 to the exterior surface of steerer tube 16 because sleeve 50 is rigidly mounted to steerer tube 16 by wedge clamp 44 which attaches inside the bore of steerer tube 16.

Handlebars 55 are at the end of a stem 58 which is mounted to sleeve 50, for example by welding. Top cap 43, rod 42, sleeve 50, and stem 58 are all parts of a single unitary component which may be fabricated, for example, by welding, casting, brazing, adhesive bonding, pinning, or any other known process compatable with the materials being used.

Sleeve 50 has external threads 60 in a region near its lower edge. A locking nut 62 is threaded on threads 60. A lower engagement surface 64 of locking nut 62 bears against top surface 29 of compression ring 27. Locking nut 62 preferably has an inwardly projecting flange 68 and engagement surface 64 extends onto flange 68 to contact fully the top surface of compression ring 29. Flange 68 also serves to prevent locking nut 62 from being screwed too far up collar 50. Threads 60 preferably have a fine pitch to allow accurate adjustment of bearing pre-load.

Pre-load on bearing assemblies 20 and 23 may be adjusted by turning locking nut 62. Locking nut 62 is preferably provided with locking means. Suitable locking means may be provided by making a gap 66 in locking nut 62 and providing a set screw 65 which passes through a clearance hole on one side of gap 66 and is threaded into lock nut 62 on the other side of gap 66. Locking nut 62 can then be locked in place by tightening set screw 65 to clamp locking nut 62 around threaded region 60. Alternative locking means such as one or more radially aligned set screws, or a vertically oriented set screw for clamping together the edges of a horizontal slit in locking nut 62, may be provided in substitution for gap 66 and screw 65.

If an upper bearing assembly is used which does not require a compression ring 27 then lower engagement surface 64 may bear directly on second race 23B of upper bearing assembly 23.

Steering assembly 10 can be assembled by: inserting steerer tube 16 through head tube 12; placing stem assembly 40 on top of steerer tube 16 with rod 42 fully inserted into the bore of steerer tube 16; tightening bolt 48 to fix stem assembly 40 in place; adjusting bearing pre-load by means of locking nut 62; and locking nut 62 in place with screw 65. It can readily be appreciated that, if locking nut 62 is accidentally over-tightened, bearing pre-load can be properly set by loosening locking nut 62. Locking nut 62 is in direct contact with upper bearing assembly 23. After screw 65 has been loosened, locking nut 62 may be adjusted by hand to set bearing pre-load force to an acceptable value.

While the means for applying pre-load force to bearing assemblies 20 and 23 preferably comprise a locking nut 62 threadedly engaged with threads 60, as described above, other extension means on sleeve 50 which fulfill this purpose also come within the scope of the invention. For example, a sliding member may be provided which slidably engages the lower end of sleeve 50 and means may be provided to lock the sliding member in place. The sliding member may have internal pins grooves or splines which engage external grooves pins or splines on sleeve 50.

Sleeve 50 could be clamped to the exterior surface of steerer tube 16 in addition to or in substitution for the mounting means disclosed above, which are internal to the bore of steerer tube 16. This is not preferable because providing exterior clamping means eliminates some of the advantages of the invention. However, the inventor considers that the invention, in a broad context, includes a steering assembly having a sleeve surrounding a steerer tube, a stem affixed to the sleeve, means for affixing the sleeve to a steerer tube, and extension means as described above for adjusting the pre-load on bearings in the steering assembly.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A steering assembly for a vehicle, said steering assembly comprising:

a. a head tube connected to a frame of said vehicle;

b. a steerer tube having a wheel mounted at one end thereof and a second end extending through said head tube and projecting past an upper end of said head tube;

c. a bearing assembly at said upper end of said head tube;

d. a stem assembly connected to said steerer tube; said stem assembly comprising:

e. a plug slidably engaged in a bore of said steerer tube;

f. mounting means on said plug to affix said plug within said bore;

g. a sleeve connected to said plug and extending over an outer surface of said steerer tube; and h. extension means on said sleeve for applying pre-load force to said bearing assembly.

2. The steering assembly of claim 1 wherein said mounting means comprises an element having a surface, said surface movable radially outwardly to forcefully engage an inner wall of said bore.

3. The steering assembly of claim 1 wherein said mounting means comprises a wedge clamp comprising an inclined engagement surface on an end of said plug, a wedge slidably engaged with said engagement surface, and means for drawing said wedge toward said plug.

4. The steering assembly of claim 1 wherein said extension means comprises threads on an exterior surface of said sleeve and a nut threadedly engaged with said threads, said nut having a contact surface in pressing engagement with an upper surface of said bearing assembly.

5. The steering assembly of claim 4 wherein said nut further comprises locking means to lock said nut in place on said threads.

6. The steering assembly of claim 5 wherein said steerer tube has an unthreaded outer surface.

7. The steering assembly of claim 6 wherein said bore of said steerer tube is non-threaded.

8. The steering assembly of claim 5 wherein said locking means comprise a gap in said nut and a screw threaded into an aperture in said nut for drawing opposite sides of said gap together.

9. The steering assembly of claim 5 wherein said nut comprises an inwardly extending flange having a central aperture smaller in diameter than an external diameter of said sleeve at a lower end thereof.

10. The steering assembly of claim 9 wherein said contact surface extends over a lower surface of said flange.

11. The steering assembly of claim 5 wherein said bearing assembly comprises a first race carried on said steerer tube with a clearance therebetween; a compression ring having a contact surface for contacting a contact surface on the first race, the contact surfaces being tapered at an angle to a longitudinal axis of said steerer tube, and said contact surface of said nut is in pressing engagement with said compression ring.

12. A stem assembly for use in a bicycle having a threadless steerer tube, said stem assembly comprising:

a. a cap;

b. a rod slidably engageable in a bore of a steerer tube and affixed to said cap;

c. mounting means on said rod for affixing a first end of said rod within said bore of said steerer tube;

d. a cylindrical sleeve mounted to said cap concentric with said rod, said sleeve slidably engageable around an exterior surface of said steerer tube, said sleeve and said rod defining a deep annular channel therebetween for receiving an end of said steerer tube;

e. attachment means on said sleeve for attaching handlebars to said stem assembly; and f. extension means at an end of said sleeve away from said cap for applying a longitudinal force to said end of said sleeve.

13. The stem of claim 12 wherein said end of said sleeve away from said cap is radially adjacent said mounting means.

14. The stem of claim 12 wherein said mounting means comprises a bolt extending through said cap, wherein tightening said bolt urges a surface connected to said rod radially outwardly to forcefully engage an inner wall of said bore.

15. The stem of claim 13 wherein said mounting means comprises a wedge clamp comprising an inclined engagement surface on an end of said rod, a wedge slidably engaged with said engagement surface, and means for drawing said wedge toward said rod.

16. The stem of claim 12 wherein said extension means comprises an externally threaded section on said sleeve and a nut threaded on said threaded section, said nut having a contact surface projecting past said end of said sleeve.

17. The stem of claim 16 further comprising locking means for locking said nut in a selected position.

18. The stem assembly of claim 17 wherein said locking means comprise a gap in said nut and a screw threaded into an aperture in said nut for drawing opposite sides of said gap together.

19. A steering assembly for a vehicle, said steering assembly comprising:

a. a head tube connected to a frame of said vehicle;

b. a steerer tube having a wheel mounted at one end thereof and a second end extending through said head tube and projecting past an upper end of said head tube;

c. a bearing assembly at said upper end of said head tube;

d. a stem assembly mounted to said steerer tube;

said stem assembly comprising:

e. a sleeve slidably fitted over an outer surface of said steerer tube;

f. means for clamping said sleeve to said steerer tube;

g. a stem for mounting handlebars attached to said sleeve; and h. extension means on said sleeve, below said stem, for applying pre-load force to said bearing assembly.

\* \* \* \* \*